(12) United States Patent
Buss et al.

(10) Patent No.: US 6,259,720 B1
(45) Date of Patent: Jul. 10, 2001

(54) VERSATILE DIGITAL SIGNAL PROCESSING SYSTEM

(75) Inventors: John Michael Buss, Tempe; James Douglas Dworkin; Stephen Lee Smith, both of Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/764,344

(22) Filed: Dec. 12, 1996

(51) Int. Cl.$^7$ .................................................. H04B 1/69
(52) U.S. Cl. ............................................. 375/130; 375/148
(58) Field of Search .................................. 375/130, 147, 375/148

(56) References Cited

U.S. PATENT DOCUMENTS

| | | | |
|---|---|---|---|
| 4,701,934 | * 10/1987 | Jasper | 375/206 |
| 4,785,463 | * 11/1988 | Janc et al. | 375/206 |
| 5,483,549 | * 1/1996 | Weinberg et al. | 375/200 |

OTHER PUBLICATIONS

Gray Chip, DSP Chips & Systems, "GC1011A Digital Receiver Chip" Nov. 24, 1992 pp. 1–28.
Gray Chip, DSP Chips & Systems, "GC1012 Digital Tuner Chip" Feb. 14, 1996 pp. 1–29.
Gray Chip, DSP Chips & Systems, "GC4014 Quad Receiver Chip" Oct. 31, 1996, pp. 1–32.
Gray Chip, DSP Chips & Systems, "GC4114 Transmit Chip" Jun. 25, 1996 pp. 1–30.

* cited by examiner

Primary Examiner—Don N. Vo
(74) Attorney, Agent, or Firm—Randi L. Dulaney

(57) ABSTRACT

A programmable versatile digital signal processing system architecture (FIG. 5) allows the implementation of functions for transmitting and receiving a variety of narrow and wide-band communication signaling schemes. The flexibility of the architecture (FIG. 5) makes it possible to receive and transmit many different spectral communication signals in real time by implementing signal processing functions such as filtering, spreading, de-spreading, rake filtering, and equalization under the direction of program instructions (FIGS. 13, 14, 15, and 16).

21 Claims, 7 Drawing Sheets

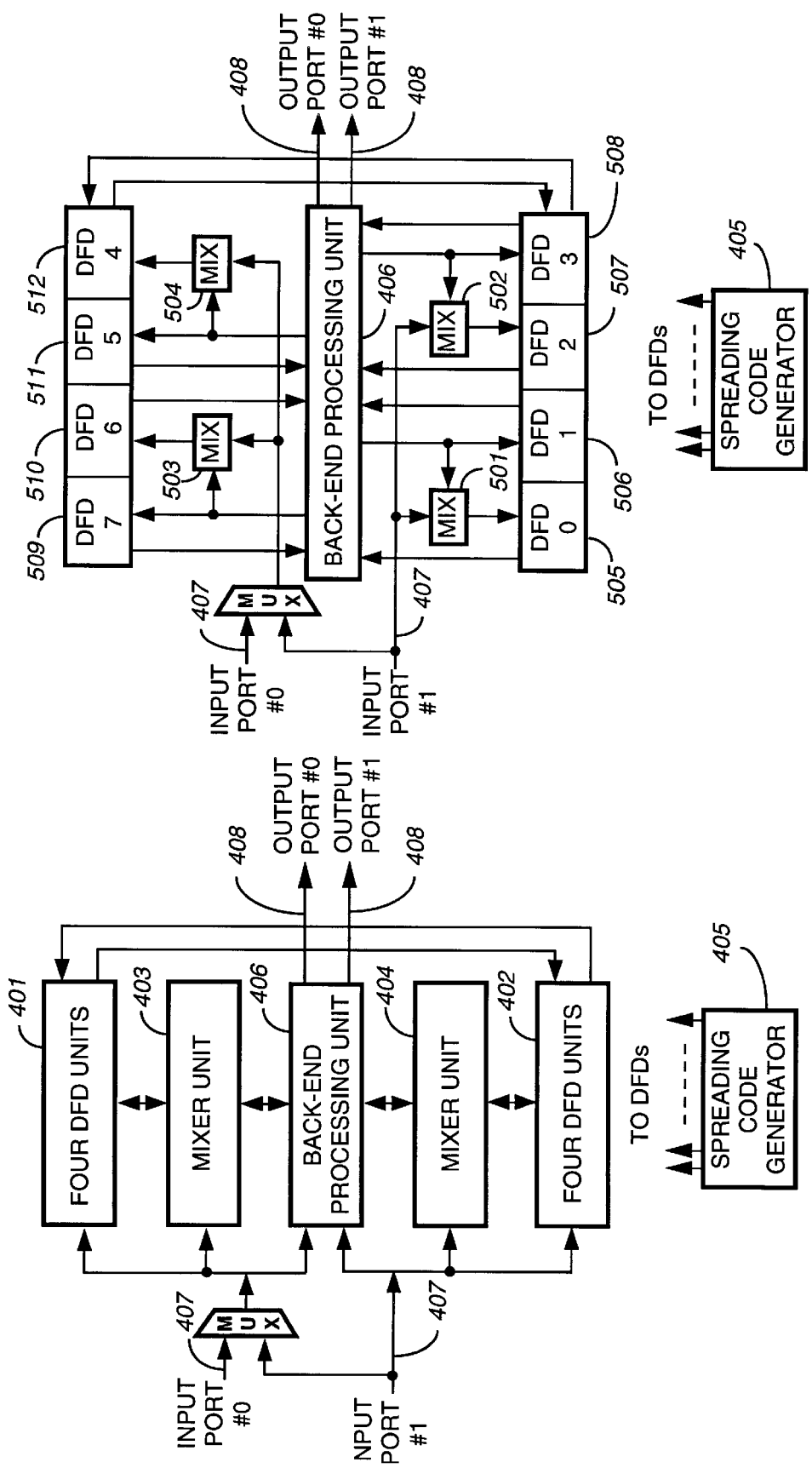

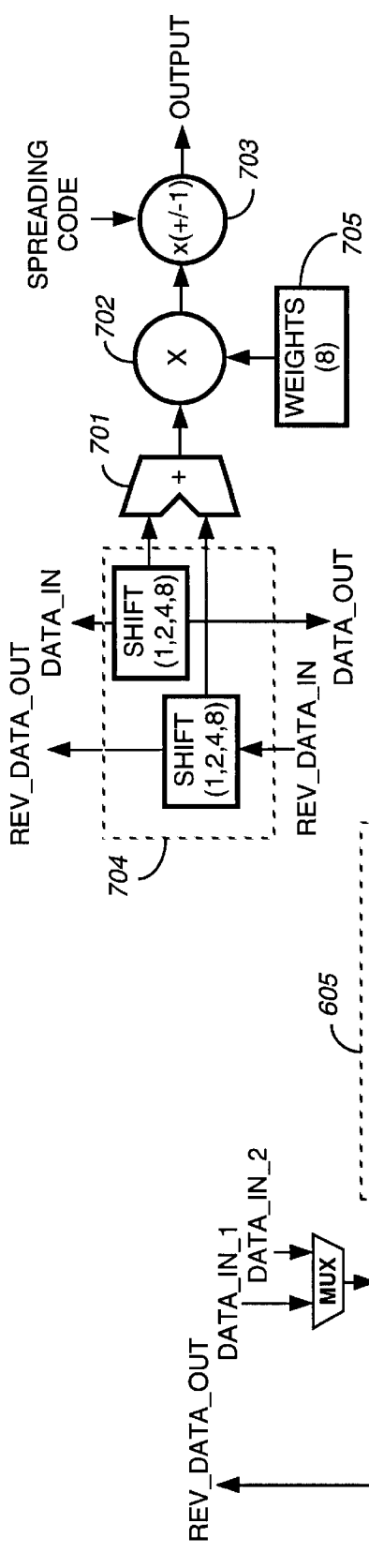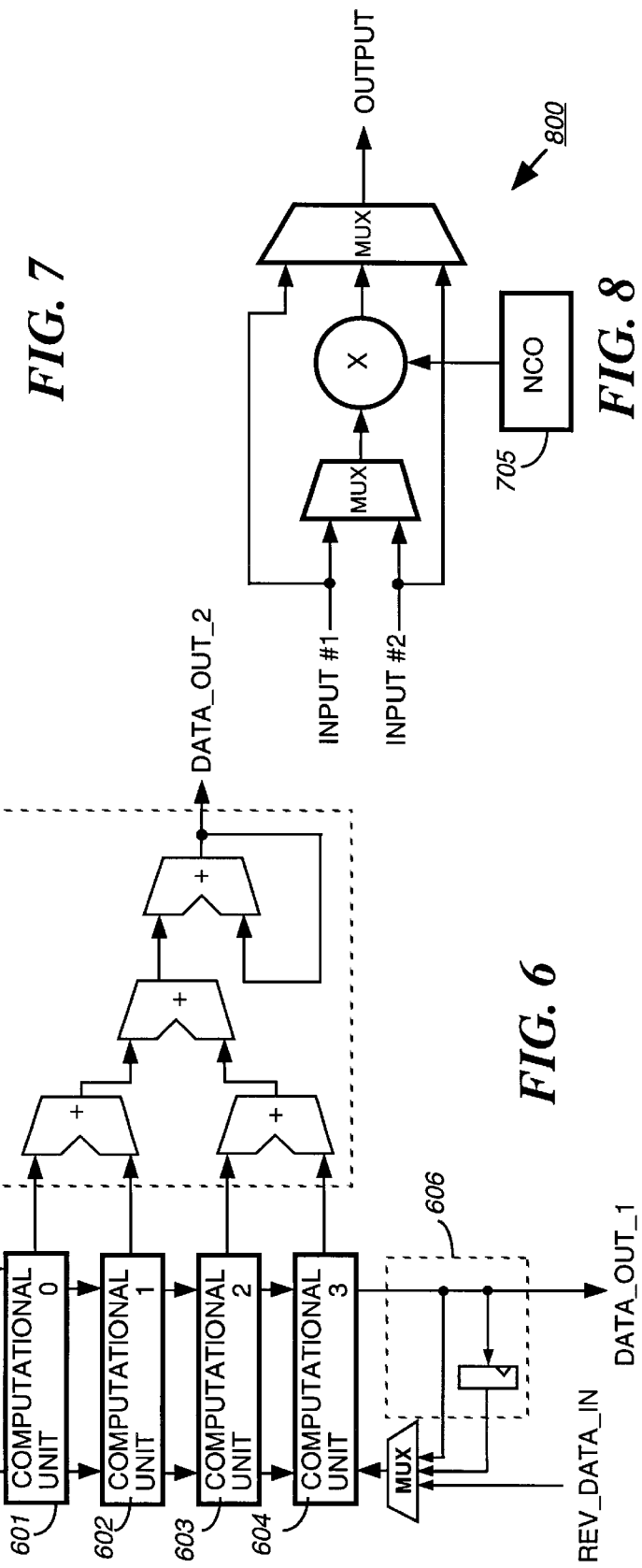

US 6,259,720 B1

VERSATILE DIGITAL SIGNAL PROCESSING SYSTEM

FIELD OF THE INVENTION

This invention relates in general to digital signal processors and more particularly to a software configurable digital signal processing system for radio frequency applications.

BACKGROUND OF THE INVENTION

General digital signal processing devices have been available since the early 1980's. However, due to technology limitations, e.g., device characteristics and topology constraints, the utility of this group of devices has been limited to the processing of relatively low frequency signals. With the explosion of wireless communications, there is a great need for a general purpose device that can suitably process signals for transmission and reception. Because of the lack of spectrum available to carry modern signaling schemes, developers are turning to schemes such as spread spectrum modulation or the like, which require extremely high performance signal processors. One solution has been to design and fabricate either discrete solutions or attempt a costly custom integrated circuit that handles the signal processing chores. Although these alternatives may fill a short term need and allow a manufacturer to place a product in the market, the long and tedious design cycles associated with such implementations may cause delays that prevent a manufacturer from grasping an opportunity during the most preferable time frame, thus establishing themselves as a pioneer and standard setter in the field.

Consequently, an architecture is needed that allows a designer and manufacturer to quickly implement demanding digital signal processing solutions in a flexible manner that allows multiple iterations without the extended product cycle time associated with discrete or custom integrated circuit products.

SUMMARY OF THE INVENTION

Briefly, according to the invention, there is provided a programmable versatile digital signal processing system architecture allows the implementation of functions for transmitting and receiving a variety of narrow and wideband communication signaling schemes. The flexibility of the architecture makes it possible to receive and transmit many different spectral communication signals in real time by implementing signal processing functions such as filtering, spreading, de-spreading, rake filtering, and equalization under the direction of program instructions.

BRIEF DESCRIPTION OF THE DRAWINGS

FIG. 4 is a specific high level implementation of the high performance digital signal processing system shown in FIG. 3.

FIG. 5 is an architectural block diagram of the high performance digital signal processing system shown in FIG. 4.

FIG. 6 is a block diagram of a de-spread, filter, decimate (DFD) block as used in the high performance digital signal processing system shown in FIG. 5.

FIG. 7 is a block diagram of a computational unit as used in the high performance digital signal processing system shown in FIG. 5.

FIG. 8 is a block diagram of a mixing unit as used in the high performance digital signal processing system shown in FIG. 5.

DESCRIPTION OF A PREFERRED EMBODIMENT 1.1 Digital Signal Processing System

The topology described herein comprises an architecture for a digital signal processing system capable of receiving and transmitting a variety of narrow and wide-band communications signals. To allow the flexibility of receiving many different signaling waveforms, the digital signal processing system architecture is programmed to perform filtering, de-spreading, rake filtering, and equalization.

1.2 Signal Reception

Figure 1:
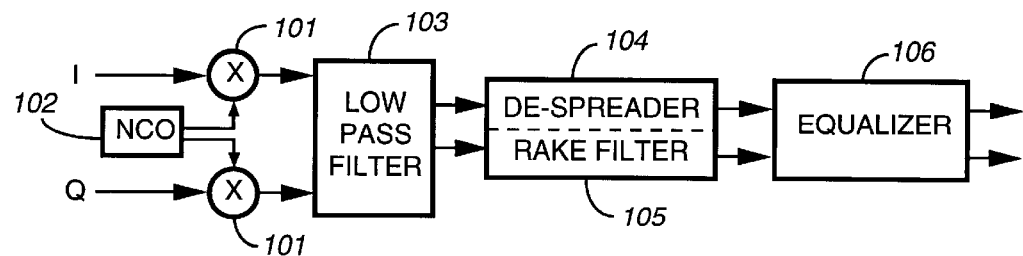
FIG. 1 is a general block diagram of a digital signal processing system for reception of narrow or wide-band signals.

Preferably, the digital signal processing system will fine-tune to a desired frequency, receive a narrow or wide-band signal, and operate cleanly in a multipath environment. A general block diagram is shown in FIG. 1 for reception of narrow or wide-band signals. Conventional analog circuitry (not shown) converts an incoming modulated radio frequency (RF) signal to a near base-band, intermediate frequency (IF) signal. The IF signal is then converted to digital by conventional high speed A/D converters (not shown), such as a delta-sigma A/D converter or the like. The I and Q inputs to the tuner are digital data streams representing in-phase and quadrature phase signals. Operationally, the tuner fine-tunes the I and Q signals to base-band by mixing 101 the signals with sine and cosine waves (injection signal(s)) generated from the numerically controlled oscillator (NCO) 102 and low-pass filters (LPF) 103 the mixed signals. Once the signals are at base-band, they are de-spread 104 by multiplying the signals by a spreading code and low-pass filtered again. To handle multipath environments, multiple-spreading paths operate on the signal using different portions of the spreading code. The results from the de-spreading paths (called prongs of a rake filter 105) are combined to create a stronger signal. The equalizer 106 then removes inter-symbol interference and multipath rays and provides matched filtering and narrow-band interference rejection. The equalizer 106 consists of two filter structures as will be later discussed. The signal can now be demodulated using a conventional demodulator (not shown), which is outside the digital signal processing system.

1.3 Signal Transmission

Figure 2:
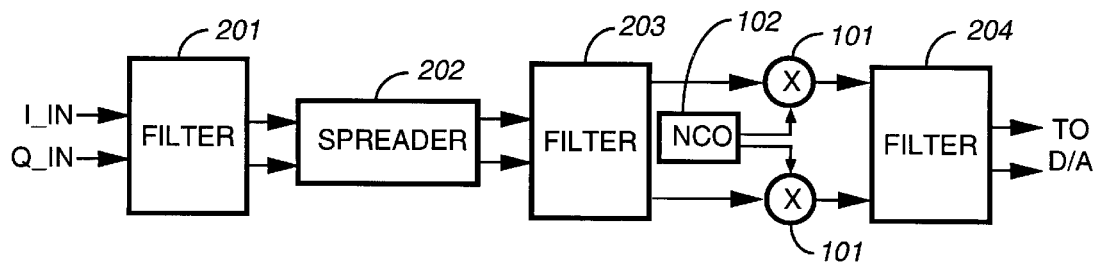
FIG. 2 is a general block diagram of a digital transmitter for transmission of narrow or wide-band signals in accordance with the preferred embodiment of the present invention.

Creating a signal suitable for RF transmission requires some of the same functions as reception. A general block diagram is shown in FIG. 2 for transmission of narrow or wide-band signals. Modulated data generates intermediate signals that are filtered, spread, filtered, mixed, and filtered again. Even though the general purpose diagram for the transmitter appears more complicated than for reception, the overall system performance requirements for transmission are typically lower than that of reception.

1.4 Non-symmetric FIR Filters

The most processing-intensive function of the tuner is filtering due to the large amount of multiplies needed at high data rates. Finite-impulse response (FIR) filters are used for the basic filter structure in digital signal processing system architecture. For FIR filters, the following equation defines their operation:

$$y(n) = \sum_{k=0}^{N-1} w(k) \cdot x(n-k) \quad [1]$$

In this equation, x is the input data stream or signal, y is the output data stream or output signal, w is the tap weights and N is the number of taps. For N taps, N multiplications and N additions are performed for each output.

1.5 Symmetric FIR Filters

Common filters are symmetric about the center tap (weights equidistant from center tap on each side have the same value). Equation [1] can be factored to take the following form for N even and even symmetry:

$$y(n) = \sum_{k=0}^{\frac{N}{2}-1} w(k) \cdot [x(n-k) + x(1-N+k+n)] \quad [2]$$

With a symmetric filter, there are N/2 multiplications and N additions. An example filter usable in the tuner is a 128 tap symmetrical FIR filter with no decimation operating at 25 Msamples/s; this would require 64 multiplies and 128 additions at a 25 MHz data rate.

1.6 Decimation

Decimation or down-sampling reduces the computational requirements for FIR filters. Decimation is achieved by removing samples from the output data stream or output signal, so with only a portion of the y(n) outputs needed only that portion is calculated. A decimation factor of two means every other output is required which cuts the necessary computations in half. In general, the number of computations reduces by the decimation factor. Another example filter is a 128 tap symmetrical FIR filter with 2:1 decimation operating at 50 Msamples/s. This filter would require 64 multiplies and 128 additions at a 25 MHz output rate (with an input rate of 50 MHz).

2.0 System Architecture

Figure 3:
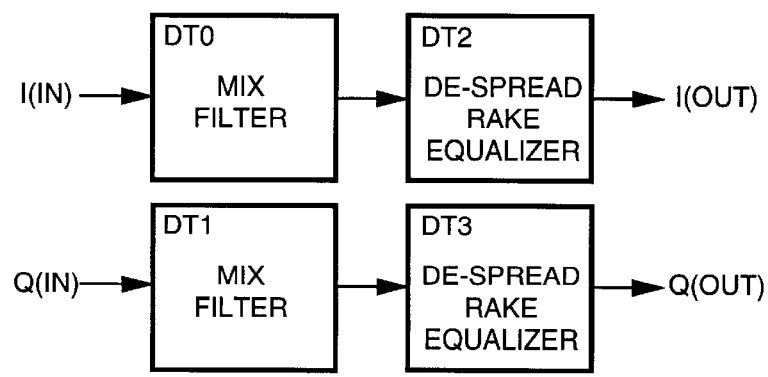
FIG. 3 is a high level block diagram of a high performance digital signal processing system in accordance with the preferred embodiment of the present invention.

The digital signal processing system disclosed may perform down mixing, de-spreading, rake filtering, and equalization on both the I and Q data streams. In prior art digital signal processing systems, accomplishing all of these functions required such a large amount of hardware that it was impractical to place it on a single integrated circuit (chip) for a digital signal processing system application. Therefore, a single programmable chip, capable of performing any of the above functions is needed to implement the digital signal processing system. The chip described herein is capable of performing any single function at the highest performance required, or several functions simultaneously, each at lower performance levels. An example of how this chip is assembled and programmed in a high performance digital signal processing system is shown in FIG. 3.

The versatile digital signal processing chip's high performance signal processing is accomplished using a parallel processing architecture. Each parallel processing unit, called a "DFD" for de-spread, filter, decimate, calculates FIR filters with or without decimation and performs de-spreading. Cascading DFD blocks together allows the calculation and realization of larger filters.

FIG. 4 shows a general block diagram for the versatile digital signal processing chip. The chip contains two banks of four DFD units 401, 402, two mixer units 403, 404, spreading-code generator 405, and back-end processing unit 406. Two input ports 407 and two output ports 408 accommodate data movement in and out of the chip.

FIG. 5 shows a more detailed block diagram of the versatile digital signal processing chip's architecture shown in FIG. 4.

The illustration shows that the versatile digital signal processing chip contains four mixers 501, 502, 503, 504, eight DFD blocks 505, 506, 507, 508, 509, 510, 511, 512, a spreading code generator 405, and back-end processing unit 406. The DFDs are connected to each other in series by two data buses and have inputs from the mixers and back-end processing unit. The mixers have inputs from the back-end processing unit and the two input ports for converting input signals. The DFD outputs are connected to the back-end processing unit. The processed signal outputs of the chip come from the back-end processing unit. By using eight separate cascaded processing blocks, the chip is capable of implementing one large filter or combinations of filtering, de-spreading, and equalization.

2.1 DFD (De-spread, Filter, Decimate)

A diagram of a DFD block is shown in FIG. 6. Each DFD block contains four computational units 601, 602, 603, 604, an adder tree 605 and an accumulator 606. The computational units may transfer input data to each other in forward and reverse directions with a selectable turnaround on one end. The two directions of the delay line are used for symmetric filters; and the turnaround allows for even and odd symmetry or cascading of DFD blocks to implement such filters. The adder tree 605 sums the outputs of the four computational units 601, 602, 603, 604, and the accumulator 606 sums outputs of multi-cycle filter calculations. Multi-cycle filter calculations may occur anytime the DFD block calculates a filter of greater then four taps. Each DFD block is capable of calculating up to a 32 tap non-symmetric filter and a 64 tap symmetric filter. One of ordinary skill in the art would realize that this architecture can be easily extended to accommodate larger more complex filters by following the same design methodology described herein.

2.2 Computational Unit

FIG. 7 shows a block diagram of the computational unit. Each computational unit inside the DFD blocks contains an adder 701, multiplier 702, multiply by 1 or −1 block 703, input data storage units 704, and data storage for eight weights 705. The input data storage units 705 operate as shift registers and hold up to eight data values each. The adder 701 is used to sum two inputs when calculating symmetric filters. The multiply 1/−1 block 703 is used for de-spreading with RAKE filtering. The output of the "de-spreader" is referred to as a de-spread signal.

2.3 Mixing Unit

FIG. 8 shows a diagram of a mixing unit 800. The mixing unit multiplies an incoming signal with a sine or cosine wave generated in the numerically controlled oscillator (NCO) 102. The multiplier uses one of two possible input data ports as the input operand. The entire mixing operation can be bypassed at the output of this block.

2.4 Back-end Processing Unit

Figure 9:
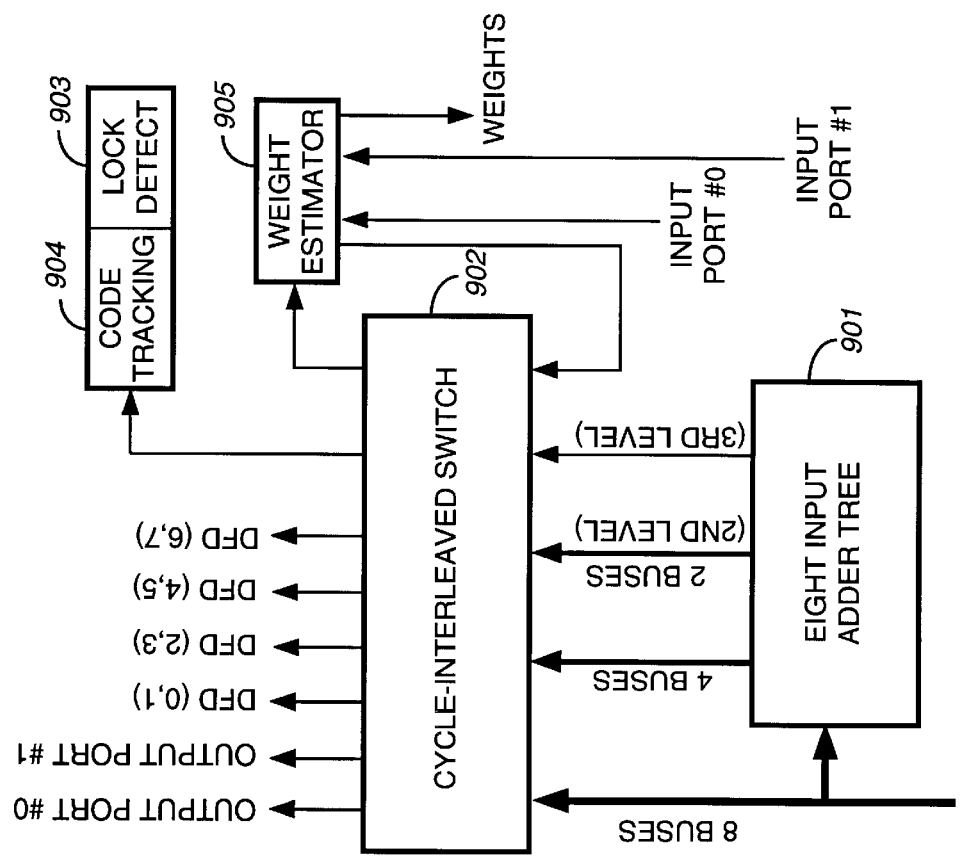
FIG. 9 is a block diagram of a back-end processing unit as used in the high performance digital signal processing system shown in FIG. 5.

FIG. 9 shows a block diagram of the back-end processing unit 406. The back-end processing unit 406 consists of an adder tree 901, a cycle-interleaved switch 902, lock detect unit 903, code tracking unit 904, and weight estimator 905. The eight input adder tree 901 sums data from the DFD blocks and has outputs from three levels of the tree. Four outputs from the first level are results of summing two adjacent DFD blocks; the two outputs from the second level are results of summing four blocks; the last output from the third level is the summation of all eight DFD blocks. The cycle-interleaved switch 902 connects the eight DFD outputs, the seven outputs from the adder tree 901 and the output from the weight estimator 905 to the chip outputs, inputs to eight DFD blocks on four buses, lock detect 903/code tracking 904 units, and the weight estimator 905. The cycle-interleaved structure of the switch allows the connection of four inputs to four outputs at the highest data rate or more than four connections at lower data rates. The lock detect 903 and code tracking 904 units are for de-spreading and RAKE filtering; the weight estimator 905 is for the equalizer function.

2.5 Architecture Summary

The architecture for the versatile digital signal processing chip comprises eight parallel processing units called DFDs, four mixers, and a back-end processing unit. Each DFD unit consists of four computational units, each with a multiplier. With eight DFDs and four mixers, the architecture has 36 total multipliers. Each DFD block has 8 adders and the adder tree in the back-end processing unit has seven adders; the architecture has 71 total adders. Depending on the implementation, additional adders and multipliers may be required in the code tracking, lock detect, and weight estimator units. Table 1 summarizes the number of multipliers and adders in the current architecture. Note that numbers for the DFD and mixer rows are presented for single and multiple blocks.

TABLE 1

| Block | Multipliers | Adders |
|---|---|---|
| Mixer | 1 (× 4 = 4) | 0 |
| DFD | 4 (× 8 = 32) | 8 (× 8 = 64) |
| Adder Tree | 0 | 7 |
| Lock Detect | as required | as required |
| Code Tracking | as required | as required |
| Weight Estimator | as required | as required |
| Totals = | ≧ 36 | ≧ 71 |

3.1 Operation

The versatile digital signal processing chip performs at least the functions of mixing, filtering, de-spreading, and equalizing. The programmable nature of the architecture described above allows single or multiple function operation. The number of simultaneous functions a single chip can handle depends on the performance requirements of the application. This section discusses the operation of the above functions and their performance limits.

3.2 Mixing

Mixing is the process of multiplying a signal with a sine or cosine wave. This creates copies of the information at different frequencies. Filtering after mixing rejects all but the desired copy of the information. As seen in FIG. 5, there are four mixers in the versatile digital signal processing chip architecture. Having four mixers allows the simultaneous tuning of four channels or staged tuning of one or two channels.

As used here, a mixer is a multiplier with inputs from the input port (the input signal) or the back-end processing unit, and a numerically controlled oscillator as seen in FIG. 8. The results of up to four multiplications from four mixers, which can be bypassed, are input to DFDs 0, 2, 4, and 6. At that point the new signal(s) can be filtered by a single or multiple DFD blocks. In this example, the mixers can run at full chip speed.

3.3 FIR Filtering

Each DFD block pictured in FIG. 6 can calculate a 4 tap non-symmetric or 8 tap symmetric FIR filter at the highest clock rate and 2, 4 or 8 times greater tap lengths at lower clock rates. The following example illustrates the operation for a four tap non-symmetric filter. The series of equations below represent the expansion of four outputs of equation [1].

$$y(0)=w(3)x(-3)+w(2)x(-2)+w(1)x(-1)+w(0)x(0)$$

$$y(1)=w(3)x(-2)+w(2)x(-1)+w(1)x(0)+w(0)x(1)$$

$$y(2)=w(3)x(-1)+w(2)x(0)+w(1)x(1)+w(0)x(2)$$

$$y(3)=w(3)x(0)+w(2)x(1)+w(1)x(2)+w(0)x(3)$$

Each computational unit (FIG. 7) inside the DFD calculates one term of the four term equation; the adder tree then sums the four terms creating a finished output. Shifting the input data and repeating the calculations creates successive outputs.

The last example can be expanded to the symmetric filter of equation [2] by looping the input data in the reverse direction and adding the corresponding x values contained in the reverse data registers before the multiplication with the weight (see adder in reference to FIG. 7).

In addition to filters calculated a full chip speed, lower input data speeds and/or decimation allow calculation of filters with greater tap lengths. Each computational unit's (CU) shift registers are capable of holding 2, 4, or 8 samples needed for larger filters. With every factor the tap length increases, either the input speed decreases or the decimation factor increases by that amount. So if the number of taps double, the input rate is reduced by ½ or the decimation factor is doubled. In this mode of operation, portions of the output calculate at every full speed cycle; the accumulator in the DFD block sums the outputs of the adder tree over multiple cycles.

Cascaded DFD blocks perform FIR filtering with a greater number of taps compared to a single DFD at the same speed. When multiple blocks are cascade the final sum is calculated by the adder tree in the back-end processing unit (FIG. 9). For example, two DFD blocks connected together by the data and rev_data ports calculate an eight tap non-symmetric or sixteen tap symmetric filter at full chip speed. All eight DFD blocks cascaded together calculate a filter of length 32 for non-symmetric and 64 for symmetric at full chip speed. At lower speeds, or when decimating, even larger tap filters are possible. Table 2 shows the possible filter configurations of the versatile digital signal processing chip. Note that the tap lengths are half the values stated in the table when using non-symmetric filters.

TABLE 2

| DFD blocks used | Taps @ full chip speed (symmetric) | Taps @ ½ chip speed or decimate by 2 (symmetric) | Taps @ ¼ chip speed or decimate by 4 (symmetric) | Taps @ ⅛ chip speed or decimate by 8 (symmetric) |
|---|---|---|---|---|
| 1 | 8 | 16 | 32 | 64 |
| 2 | 16 | 32 | 64 | 128 |
| 4 | 32 | 64 | 128 | 256 |
| 8 | 64 | 128 | 256 | 512 |

3.4 Infinite Impulse Response (IIR) Filter

The versatile digital signal processing chip is capable of implementing an IIR filter function. IIR filters have the form of equation [4] shown below.

$$y(n) = \sum_{k=0}^{N-1} w(k) \cdot x(n-k) + \sum_{k=1}^{M-1} h(k) \cdot y(n-k) \quad [4]$$

As seen in the equation, an IIR filter is the summation of two FIR filters. One filter has the digital signal as its input, the other has the filter output as its input. Each FIR filter is calculated in separate DFDs and the back-end processing unit performs the final summation of the two filter outputs.

3.5 De-spreading and Rake Filtering

Figure 10:
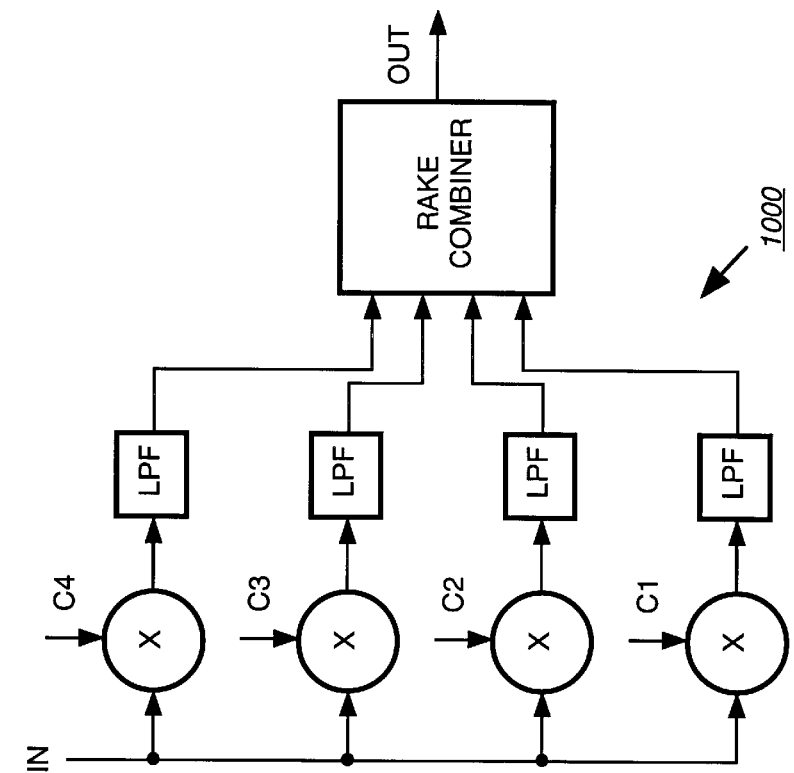
FIG. 10 is a block diagram of an exemplary four prong rake filter implemented by the digital signal processing system.

FIG. 10 shows a diagram of an exemplary four prong rake filter implemented by the digital signal processing system 1000.

The digital signal processing system first de-spreads the received signal by multiplying the signal by a spreading code and then low-pass filtering. In the versatile digital signal processing chip, the spreading codes take on a value of positive or negative one (binary). This particular de-spreader can be expanded to operate in a multipath environment by multiplying the signal by different portions of the spreading code, filtering each portion, then combining all the pieces. This process is commonly called rake filtering, and each portion with its associated filter is called a prong.

Figure 11:
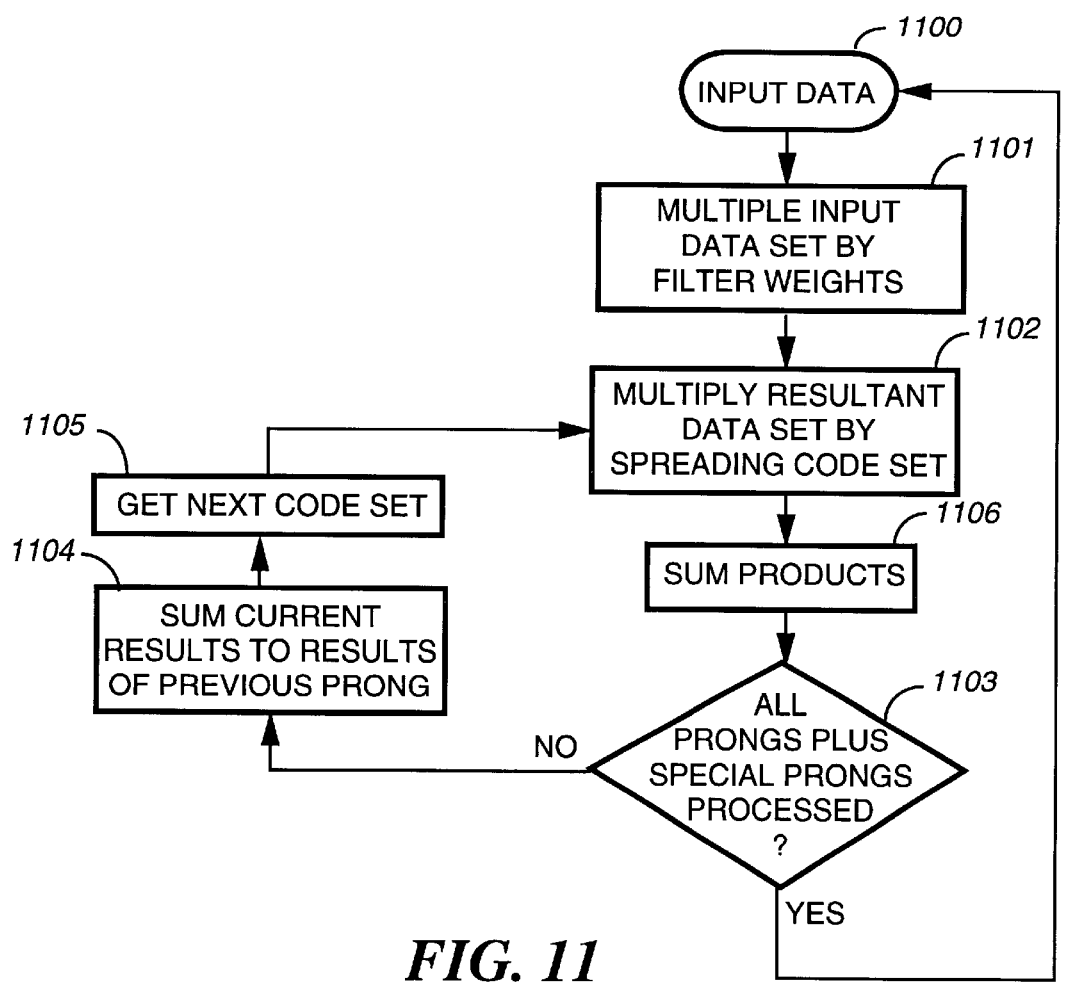
FIG. 11. is a flow diagram of the process required to accomplish the de-spreading function discussed in reference to FIG. 10.

FIG. 11. illustrates the process required for the hardware of the digital signal processing system to accomplish the de-spreading function discussed in reference to FIG. 10. This flow diagram represents a system requiring less hardware than the sub-optimal example shown in FIG. 10. In this example, the filter in each prong has the same weight. By commutativity, the code multiplication can be moved between the filter's multiplication and addition layers. By arranging the topology in this fashion, all filters have the same input and weight set, and only one multiplication layer is needed for all prongs in the rake. Each set of products resulting from multiplication of the input signal with the weight set 1101 is multiplied by a portion of the spreading code and summed 1102. This repeats 1103, 1104, 1105 for each prong as the accumulator in the DFD combines the results for all prongs 1106. The input data needs to hold its value while all prongs are processed, so the input rate must be lower than the chip's maximum rate by an amount that depends on the number of prongs being processed in a single DFD and the size of the filter. Multiple DFD blocks can process prongs of a larger rake filter if required. The final result is summed in the adder tree of the back-end processing unit. By example, two DFDs calculating four prongs each can be combined for an eight prong rake filter.

In addition to rake filtering, de-spreading also requires code tracking and lock detect status. These functions require additional prongs with special processing of the outputs. The back-end processing unit of FIG. 9 may include these special processing blocks.

3.6 Equalizer—Adaptive Filtering

Figure 12:
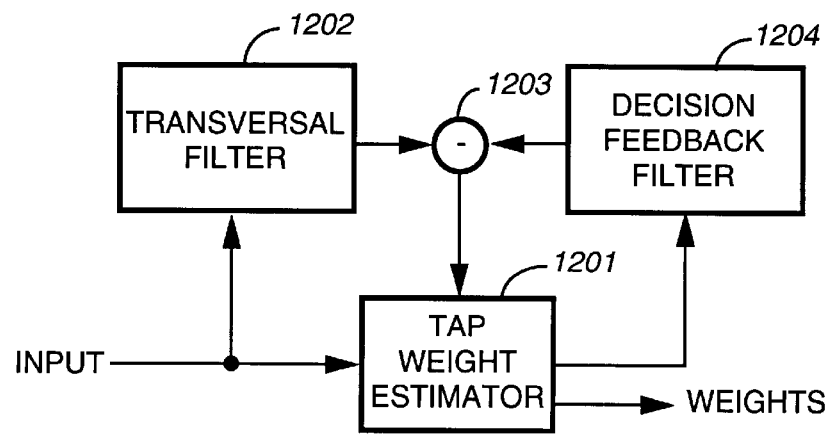
FIG. 12 is a block diagram of an equalizer implemented by the digital signal processing system.

FIG. 12 shows a preferred configuration of the equalizer. In the present processing flow example, the last function of the digital signal processing system is equalization. Equalization uses two filter structures, called transversal and decision feedback, and a weight estimator block. The tap weight estimator 1201 takes one of its inputs from the input to the transversal filter 1202 and the other input from the difference 1203 of the transversal's and decision feedback's 1204 outputs. One of the tap weight estimator's outputs is input to the decision feedback filter and the other is the updated weights for the two filters. These inputs and outputs are routed through the switch in the back-end processing unit 406 or come directly from the chip input (see FIG. 5).

3.7 Multi-function Operation

The digital signal processing system architecture is capable of simultaneously operating the mixing, filtering, de-spreading, and equalization components. Table 3 lists several example configurations for simultaneous operation of multiple functions. The mixer operation is separate from the DFDs, so it can always be performed in conjunction with the other functions of the chip. The processing for the remaining functions is divided into the eight DFD units and the back-end processing unit. The configurations listed in the table represent only four of many possible combinations.

TABLE 3

| Configuration | Mixer | LPF | De-spread | Equalization |
|---|---|---|---|---|
| 1 | yes or no | 256 tap symmetric decimate by 8 | 5 prong, 16 tap symmetric | 2–32 tap non-symmetric |
| 2 | yes or no | ½ speed 256 tap symmetric decimate by 4 | 5 prong, 16 tap symmetric | 2–32 tap non-symmetric |
| 3 | yes or no | 128 tap symmetric decimate by 4 | 5 prong, 8 tap symmetric | 2–16 tap non-symmetric |
| 4 | yes or no | 128 tap symmetric decimate by 4 | non-operational | 2–16 tap non-symmetric |

In addition to performing multiple functions on a single data stream, the architecture is capable of performing one or more functions on multiple data streams. With two data ports and four mixers on the chip, inputting two and creating four data streams is possible. As the total number of data streams increases, fewer DFDs are available to process each data stream.

Several examples of possible configurations for reception of multiple streams include:

(1) Input in-phase and quadrature signals to the chip; mix each data stream once and process individual stream in four DFDs. This provides in-phase and quadrature reception of one channel.

(2) Input in-phase and quadrature signals to the chip; mix each data stream twice and process individual stream in two DFDs. This provides in-phase and quadrature reception of two channels.

(3) Input an in-phase or a quadrature signal to the chip on input port#1; mix data stream in four mixers and process individual streams in two DFDs. This provides in-phase or quadrature reception of four channels.

One of ordinary skill in the art would realize that the prior examples represent only three of many ways for configuring the digital signal processing system architecture to achieve receiving functions.

3.8 Transmission

The digital signal processing system is capable of creating signals appropriate for RF transmission. All the functions of the digital signal processing system needed for reception may also be used in transmission, but in transmission, the functions are performed in a different order. For example, a signal would be filtered, spread, mixed, and then filtered again for transmission. At that point a D/A converter creates an analog signal which is further mixed and filtered in the analog domain. This final signal is then ready for RF transmission.

4.1 Chip Control System

The control system must be programmable to perform single or multiple function operations. When performing a single function, all DFDs operate identically on different pieces of data. In contrast, multiple function operations require the DFDs to perform different operations at the same or different data rates. Accordingly, each of the DFDs need an independent control mechanism. In addition to the DFDs, the mixers, NCOs, and the back-end processing unit must be controlled. Lastly, at the highest level, data transfer between processing blocks and off chip sources (e.g., microprocessors or the like) also needs control.

Instruction words are used to govern the operation of the versatile digital signal processing chip. Each of the chip's blocks uses a unique control word structure, and preferably includes at least 256 words of instruction memory, and a program sequencer. The instruction word format in each block contains hardware configuration information and program control (e.g., looping constructs). One or more instructions are used to form a program that operates on the incoming data. In the preferred embodiment, the instruction in each block can change every clock cycle.

Certain operations defined in the instruction word are dependent on the availability of new data. To insure correct operation of the processing system, the program will halt on an individual block basis if data is not present when the instruction requests it. Once the data becomes available, the program continues execution. For example, the mixers may request data from the input ports or the back-end processing unit, the DFDs may request data from the mixers or the back-end processing unit, or the back-end processing unit may request data from the DFDs. Any of these block's program will half if data is not available from the previous block, thus insuring data integrity.

4.2 Instruction Word Formats

Control words are shown for the mixers, the DFDs, and relevant portions of the back-end processing unit. Each of the structures uses a unique set of control bits for configuring the hardware, and a common control scheme for program flow.

4.3 Program Flow Control

The program control system in each block (mixers, DFDs, back-end processing unit) of the versatile digital signal processing chip includes seven functions and four loop counters. Each of the seven functions has a corresponding operation code. Table 4 lists the program control functions, a description of the functions, and their operation codes.

TABLE 4

| Code | Function | Description |
|------|----------|-------------|
| 000 | No operation | No control operation, proceed to next instruction |
| 001 | Jump | Jump to instruction at specified location |
| 010 | Set | Set specified loop counter to specified value |
| 011 | Repeat | Repeat current instruction a specified number of clock cycles using the specified loop counter |
| 100 | Fixed | Current instruction fixed for every cycle |
| 101 | Branch | Decrement specified loop counter and compare to zero, branch to instruction at specified location in result is not equal to zero |

Figure 13:
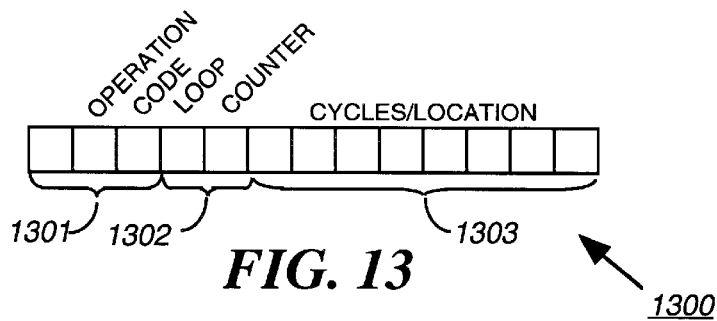
FIG. 13 is a model diagram of an instruction register for the program control word.

The bit format of the program control word 1300 is shown in FIG. 13. There is an operation code field 1301, a loop counter field 1302, and a cycles/location field 1303. The 3-bit operation code field 1301 specifies which of the seven functions to perform. The 2-bit loop counter field 1302 specifies one of four loop counters needed in the Set, Repeat, and Branch functions. The 8-bit cycles/location field 1303 specifies the number of cycles in the Repeat function or the instruction location for the Jump and Branch functions.

4.4 Mixer Instruction Word

Figure 14:
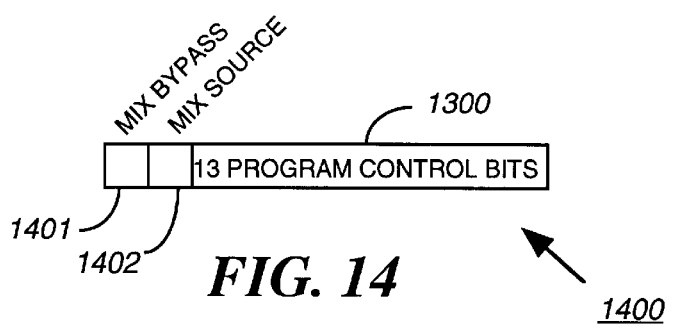
FIG. 14 shows a model diagram of an instruction register for the mixer instruction word.

FIG. 14 shows a model diagram of an instruction register for the mixer instruction word 1400. The mixer instruction word 1400 governs data transfer from the chip's data input pins and back-end processing unit to the DFDs through the mixers. The instruction word 1400 has 15 bits, two bits are for hardware configuration and 13 bits are for program control. The first bit 1401 indicates the mixing source of input pin or back-end processing unit. The second bit 1402 allows a bypass of the mixing operation. The next thirteen bits define the program control word 1300 with the same format described in reference to FIG. 13.

4.5 DFD Instruction Word

Figure 15:
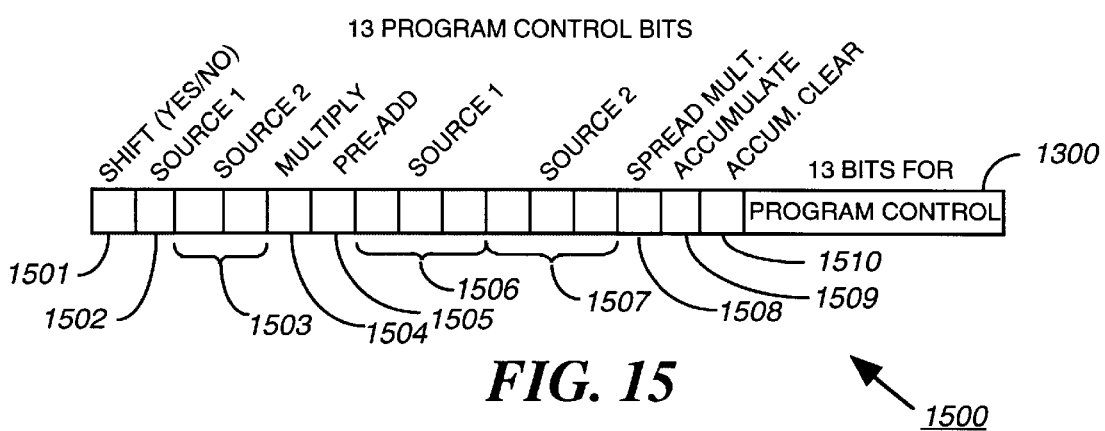
FIG. 15 shows a model diagram of an instruction register for the DFD instruction word.

FIG. 15 shows a model diagram of an instruction register for the DFD instruction word 1500. The DFD instruction word 1500 configures the hardware within the DFD and controls the program flow. The instruction word contains information on shifts, adds, multiplies, spread-code multiplies, and accumulates.

The first four bits instruct a data shift 1501, specify one of two input sources in the forward direction 1502, and specify one of three sources in the reverse direction 1503. A reverse source of "00" indicates no reverse shift. The completion of an instruction containing a shift depends on data availability. If data is not available on the specified input port, the program will wait for valid data.

The next eight bits in the instruction word govern multiplication and pre-addition in the computational unit. The first bit of this section enables the multiplication 1504, the second bit enables pre-addition of two samples 1505. The next three bits specify the location in the shift register of the first multiplication operand 1506. The last three bits indicate the location in the weight register of the second multiplication operand 1507.

The spreading multiplier bit 1508 indicates the state of this unit, active or inactive. When this unit is active, the product from the multiplier is multiplied by 1 or −1 depending on the value of the spreading code input. When inactive, data passes through this unit unchanged.

The accumulate control bits govern the operation of the accumulator at the end of the adder tree in the DFD. The accumulate bit 1509 activates the unit; the accumulate clear bit 1510 clears the data in the feedback path.

The last thirteen bits define the program control word 1300 with the same format described in reference to FIG. 13.

4.6 Back-end Processing Instruction Word

Figure 16:
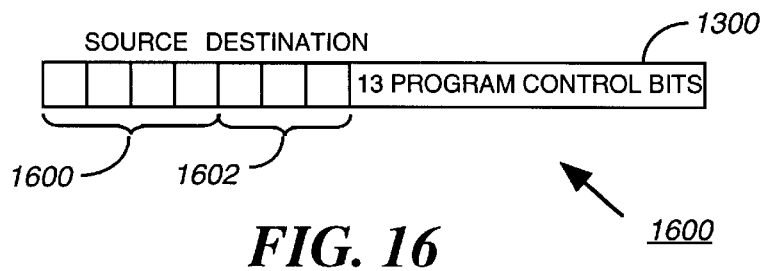
FIG. 16 shows a model diagram of an instruction register for the back-end processing instruction word.

FIG. 16 shows a model diagram of an instruction register for the back-end processing instruction word 1600.

The back-end processing instruction word configures the cycle-interleaved switch in this unit. The instruction is defined for a single data transfer. Four separate instruction streams allow up to four data transfers each cycle. For each transfer, a four bit source location and a three bit destination location is required. The first four bits are the source location (16 possible sources) 1601, the next three bits are the destination location (eight possible destinations) 1602, and the last thirteen bits define the program control word 1300 with the same format described in reference to FIG. 13. As discussed before, the completion of each transfer depends on data availability.

4.7 Memory System

Figure 17:
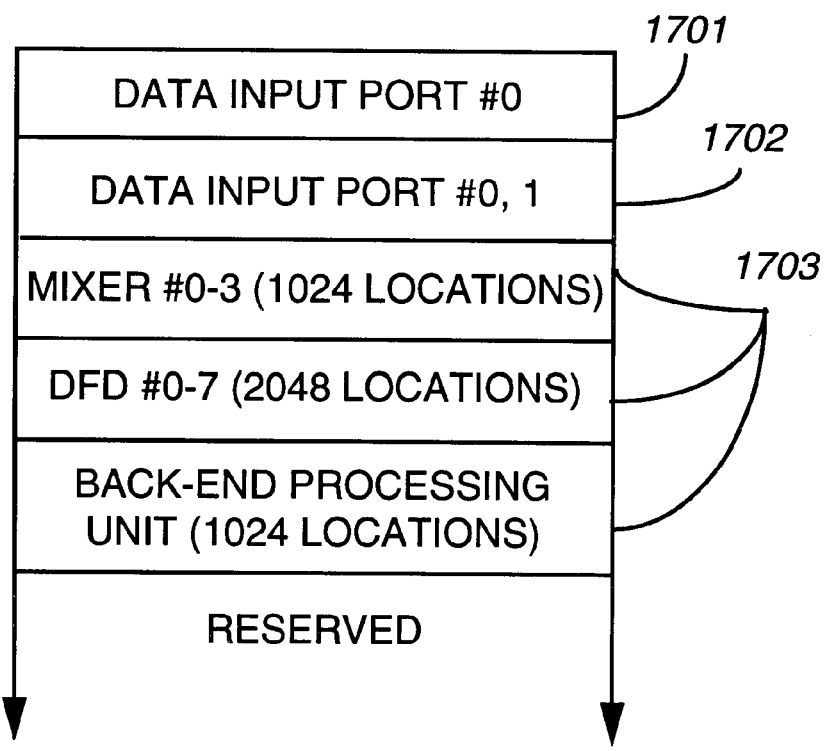
FIG. 17 is an exemplary memory map model for use with the versatile digital signal processing chip.

An exemplary memory map is shown in FIG. 17. Data is transferred in and out of the chip via a memory-mapped input/output system. Input data and instruction words are written to the versatile digital signal processing chip by a host processor. Input data locations and locations for instruction words in each block make up a memory map. The host processor writes and reads locations on the chip using an address bus to specify the location and control lines to signify write or read transfers. The data port #0 location 1701 is for data writes on input port #0; the data port #0, 1 location 1702 is for simultaneous writes of two data samples on input ports #0 and #1. The rest of the locations are for instruction words in the various blocks 1703.

To speed up the writing of identical programs to more than one processing unit, a mirror write system is used. This system fits in parallel processing architectures where multiple elements have identical memory configurations. The mirroring works by having special memory locations which represent a single location in multiple processing elements. In the versatile digital signal processing chip, simultaneous instruction writes of identical data to two, four, or all eight DFDs, or two or four mixers are possible.

Output data is not part of the memory-mapped system. Output data (representing the output signal) is placed on one or both output ports when the instruction in the back-end processing unit signifies the transfer. In addition to the data pins, control pins on both output ports signify to the system (host) that data is available. It is the responsibility of the system to retrieve the data during the specified cycle or the data will be lost.

4.8 Data Rate Synchronization

The data rate of the digital signal processing system and the clock frequency of the chip must be synchronized. Since data is written to the chip synchronously, the input data rate of the system must be an integer multiple of the chip's clock frequency. For example, clock frequency of 50 MHz requires input data rates of 50, 25, 12.5, 6.25 MHz or other integer multiples. Considering another example, a data rate of 1.15 MHz requires clock frequencies of 1.15, 2.3, 4.6, . . . , 46 MHz or other integer multiples.

Several examples of mechanisms to achieve synchronization are as follows:

(1) two clocks generated by the system, one for the A/D converter and one for the chip;

(2) a low speed clock input to the chip and an on-board programmable PLL to generate a high speed clock and synchronize to a separate clock generator outside the chip for the A/D; or (3) a low speed clock input and on-board generation of both the chip's clock and the A/D's clock.

As before, one of ordinary skill in the art would realize that the prior examples represent only three of many ways to achieve synchronization of the component sections in the digital signal processing system architecture.

The following text contains several working examples of practical applications for the digital signal processing system architecture disclosed herein.

5.1 Application—FIR filter

An FIR filter is a common communications applications and is easily explained. In this example, the exemplary filter is a 64 tap symmetric FIR filter clocked at 50 MHz. Referring back to FIG. 5, data is input on port 1, and is transferred through the mixer (bypasses), arriving at DFD 0. The data then moves serially through eight DFDs in the forward direction, looping back in DFD7, and moves through the eight DFDs in the reverse direction. While this is happening, the DFDs process the data, the outputs are added in the back-end processing unit, and the final result is output to port 1. There is new input data and output data each cycle.

This application is realized using five different programs for the various blocks in the chip. Separate programs are needed for the mixer connected to DFD 0 (mixer 0), DFD 0, DFD 1–6, DFD 7, and the back-end processing unit. The programs are explained as follows.

5.2 Mixer Program

The mixer has a simple program, bypass mixer for all time. This is accomplished by setting the mix bypass bit and using a corresponding operational code. Referring to FIGS. 13 and 14, "Mixer Control Word (15 bits)," the control word is:

0 1 100 00 00000000@location 2

(also see FIG. 17). Note: location 2 is the third location; the first location is at address 0. This is a conventional binary numbering scheme.

5.3 DFD 0 Program

DFD 0 takes input from the mixer and DFD 1, shifts data, sums samples in forward and reverse directions, multiplies by a weight and sums the result every cycle. The instruction word needs to signify a shift, input from data__in__1 port and rev__data__in port, perform a pre-addition of two samples at shift location 0, perform a multiplication with weight 0, disable spreading code multiplication, and set no accumulate or accumulate clear. Referring to FIG. 15, "DFD Instruction Word," the instruction word is:

1 0 00 1 1 000 000 0 0 0 100 00 00000000@1025

5.4 DFD 1–6 Program

These DFDs operate with a similar program to DFD 0 except the input data is from the previous DFD instead of a mixer. The control words are:

1 1 00 1 1 000 000 0 0 0 100 00 00000000@(1025+DFD#× 256)

5.5 DFD 7 Program

This DFD also has a similar program to the previous DFDs except for turning data around in the reverse direction. Assuming even symmetry (use the right most multiplexer input in FIG. 6, "DFD block diagram," the control word is:

1 1 10 1 1 000 000 0 0 0 100 00 00000000@2817

5.6 Back-end processing unit Program

The back-end processing unit has the task of adding data from all the DFDs together and sending the result to one of the output ports. Referring to FIG. 9, "Back-end processing unit," data is input from all the DFDs, added together, input to the switch from the third level of the adder tree, and sent to output port 0 every cycle. This is accomplished with the following instruction word:

1110 0000 100 00 00000000@3073

5.7 Summary

This example showed a very basic program for the digital signal processing system. The input and output data rates were equal to the chip's clock frequency; every processing unit needed only one instruction word each (using the "fixed instruction" operation). Other example applications with lower input data rates allow more complicated processing (like larger filter tap sizes). These types of applications require the use of other digital signal processing system control functions like branch, repeat, and jump.

The invention disclosed represents a chip architecture that is capable of performing multiple communication functions comprising digital mixing, filtering, de-spreading rake filtering, and equalizing. The architecture comprises four mixers, eight identical processing units called DFDs, and a back-end processing unit. In a first embodiment, these units are programmable to operate as a digital signal processing system capable of receiving and transmitting a variety of narrow and wide-band communications signals.

Target applications for the versatile digital signal processing chip include paging and cellular telephone infrastructure equipment, as well as multi-signal programmable radio transceivers.

The architecture disclosed includes features for implementing signal lock detection, code tracking, and weight estimator units. Alternatively, the chip architecture may be implemented using an embedded CPU core to perform special purpose functions like lock detection, code tracking, and weight estimating.

We claim:

1. A versatile digital signal processing system for processing an input signal, comprising:
    a programmable parallel digital signal processing unit (DFD) that implements de-spread, filter, and decimate functions for de-spreading a representation of the input signal, filtering the representation of the input signal, and decimating the representation of the input signal to create an output signal,
    wherein the de-spread, filter, and decimate functions in the DFD are implemented using a computational unit comprising
    an adder,
    at least one input data storage unit configured as a shift register and coupled to the adder;
    a multiplier, coupled to the adder and to a data storage unit for storing eight weights; and
    a multiply by 1 or −1 block coupled to the multiplier.

2. The versatile digital signal processing system of claim 1 wherein the DFD further comprises:
    an accumulator that sums outputs of the at least one input data storage unit over multiple clock cycles to implement the filter function and created a filtered signal.

3. The versatile digital signal processing system of claim 1 wherein the DFD further comprises:
    an adder tree that operates to sum outputs of a plurality of computational units and generate an output of the DFD.

4. The versatile digital signal processing system of claim 1, wherein a de-spreader in the DFD comprises:
    a multiply by 1 or −1 block that implements the de-spread function and creates a de-spread signal by multiplying the representation of the input signal by either 1 or −1 resulting in the de-spread signal.

5. A versatile digital signal processing system for processing an input signal, comprising:
    a plurality of programmable parallel digital signal processing units (DFDs) that implement de-spread, filter, and decimate functions for de-spreading a representation of the input signal, filtering the representation of the input signal, and decimating the representation of the input signal to create an output signal,
    a numerically controlled oscillator that generates an injection signal;
    a mixer coupled to the numerically controlled oscillator, the plurality of DFDs, and the input signal, the mixer selectively operating as a multiplier to convert the input signal for further processing; and
    a back-end processing unit coupled to a plurality of DFDs and the mixer, the back-end processing unit operating to generate a processed signal from signals communicated between the back-end processing unit, DFDs, and mixer, and wherein the back-end processing unit comprises
    an adder tree;
    a cycle-interleaved switch coupled to the adder tree; and
    a weight estimator, a code tracking unit, and a lock detect unit coupled to the cycle-interleaved switch.

6. The versatile digital signal processing system of claim 5, wherein the adder tree operates to sum data from the plurality of DFDs.

7. The versatile digital signal processing system of claim 5, wherein the cycle-interleaved switch operates to connect outputs of the plurality of DFDs, outputs from the adder tree, and an output of the weight estimator as the processed signal.

8. The versatile digital signal processing system of claim 7, wherein the cycle-interleaved switch further operates to connect inputs to the plurality of DFDs, connect inputs to the lock detect unit, code tracking unit, and the weight estimator.

9. The versatile digital signal processing system of claim 8, wherein the system is programmed to implement a non-symmetric Finite-Impulse-Response (FIR) filter that processes the input signal to create the output signal.

10. The versatile digital signal processing system of claim 8, wherein the system is programmed to implement a symmetric Finite-Impulse-Response (FIR) filter that processes the input signal to create the output signal.

11. The versatile digital signal processing system of claim 8, wherein the DFD is programmed to implement an Infinite-Impulse-Response (IIR) filter as a sum of two Finite-Impulse-Response (FIR) filters, the Infinite-Impulse-Response (IIR) filter operating to process the input signal and create the output signal.

12. The versatile digital signal processing system of claim 8, wherein the system is programmed to implement a programmable receiver system including at least one mixer tuned to the input signal to create a converted input signal, and at least one digital filter selected from one of a non-symmetric Finite-Impulse-Response (FIR) filter, a symmetric Finite-Impulse-Response (FIR) filter, and an Infinite-Impulse-Response (IIR) filter as a sum of two Finite-Impulse-Response (FIR) filters for processing the converted input signal to create the output signal.

13. The versatile digital signal processing system of claim 8, wherein the system is programmed to implement a programmable spread spectrum receiver system including at least one mixer tuned to the input signal to create a converted input signal, at least one DFD operating to de-spread the converted input signal, and at least one digital filter selected from at least one of a non-symmetric Finite-Impulse-Response (FIR) filter, a symmetric Finite-Impulse-Response (FIR) filter, and an Infinite-Impulse-Response (IIR) filter as a sum of two Finite-Impulse-Response (FIR) filters for processing a converted, de-spread input signal to create the output signal.

14. The versatile digital signal processing system of claim 8, wherein the system is programmed to implement a programmable spread spectrum transmitter system including at least one mixer tuned to provide the output signal, at least one DFD operating to spread the input signal, and at least one of a non-symmetric Finite-Impulse-Response (FIR) filter, a symmetric Finite-Impulse-Response (FIR) filter, and an Infinite-Impulse-Response (IIR) filter as a sum of two Finite-Impulse-Response (FIR) filters for processing the input signal and intermediate signals to create the output signal for transmission.

15. A versatile digital signal processing system for processing an input signal, comprising:
- a programmable parallel digital signal processing unit (DFD) comprising:
  - a plurality of computational units comprising:
    - an adder and at least one input data storage unit configured as a shift register and coupled to the adder;
    - a multiplier coupled to the adder and to a data storage for a plurality of weights;
    - a multiply by 1 or −1 block coupled to the multiplier, the multiply by 1 or −1 block creating a de-spread signal by multiplying a representation of the input signal by either 1 or −1; and
    - an accumulator coupled to the at least one input data storage unit for summing outputs of the data storage unit over multiple clock cycles to implement a filter function and created a filtered signal; and
  - an adder tree that opertates to sum ouputs of the plurality of computational units and generate an output of the DFD.

16. The versatile digital signal processing system of claim 15, comprising:
- a numerically controlled oscillator that generates an injection signal; and
- a mixer coupled to the numerically controlled oscillator, the DFD, and the input signal, the mixer selectively operating as a multiplier to convert the input signal for further processing.

17. The versatile digital signal processing system of claim 16, comprising:
- a back-end processing unit coupled to a plurality of DFDs and the mixer, the back-end processing unit operating to generate a processed signal from signals communicated between the back-end processing unit, DFDs, and mixers.

18. The versatile digital signal processing system of claim 17, wherein the back-end processing unit comprises:
- a back-end adder tree;
- a cycle-interleaved switch coupled to the back-end adder tree;
- a weight estimator, a code tracking unit, and a lock detect unit coupled to the cycle-interleaved switch.

19. The versatile digital signal processing system of claim 18, wherein the back-end adder tree operates to sum data from the plurality of DFDs.

20. The versatile digital signal processing system of claim 18, wherein the cycle-interleaved switch operates to connect outputs of the plurality of DFDs, outputs from the back-end adder tree, and an output of the weight estimator as the processed signal.

21. The versatile digital signal processing system of claim 20, wherein the cycle-interleaved switch further operates to connect inputs to the plurality of DFDs, connect inputs to the lock detect unit, code tracking unit, and the weight estimator.

* * * * *